(12) United States Patent
Osterlanger et al.

(10) Patent No.: US 7,263,908 B2
(45) Date of Patent: Sep. 4, 2007

(54) BALL SCREW

(75) Inventors: Jurgen Osterlanger, Emskirchen (DE); Ralf Mayer, Herzogenaurach (DE); Horst Munck, Herzogenaurach (DE)

(73) Assignee: Ina-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/154,926

(22) Filed: Jun. 16, 2005

(65) Prior Publication Data

US 2005/0247149 A1 Nov. 10, 2005

Related U.S. Application Data

(63) Continuation of application No. PCT/EP03/12970, filed on Nov. 20, 2003.

(30) Foreign Application Priority Data

Dec. 18, 2002 (DE) ............... 102 59 690
Oct. 4, 2003 (DE) ............... 103 46 080

(51) Int. Cl.
*F16H 1/18* (2006.01)
(52) U.S. Cl. ..................... 74/424.88; 384/51
(58) Field of Classification Search ............... 74/89.23, 74/89.42, 424.88; 384/51
See application file for complete search history.

(56) References Cited

U.S. PATENT DOCUMENTS

| 860,186 | A |  | 7/1907 | Beemer |  |
|---|---|---|---|---|---|
| 2,675,282 | A | * | 4/1954 | Mason | ................. 384/520 |
| 2,897,021 | A |  | 7/1959 | Zeilman |  |
| 3,037,827 | A |  | 6/1962 | Kupchick |  |
| 3,208,806 | A |  | 9/1965 | Grolmann et al. |  |
| 2002/0078775 | A1 | * | 6/2002 | Akido | ................. 74/424.88 |
| 2002/0178852 | A1 |  | 12/2002 | Yamaguchi |  |
| 2005/0247149 | A1 | * | 11/2005 | Osterlanger et al. | ..... 74/424.88 |

FOREIGN PATENT DOCUMENTS

| DE | 199 25 040 A1 | 12/1999 |
| DE | 101 22 106 A1 | 11/2001 |
| DE | 101 40 360 A1 | 3/2002 |
| EP | 0 893 612 A2 | 1/1999 |
| EP | 1 219 864 A2 | 7/2002 |
| EP | 0 930 450 B1 | 6/2003 |
| JP | 56116951 A | 9/1981 |

* cited by examiner

*Primary Examiner*—David M. Fenstermacher
(74) *Attorney, Agent, or Firm*—Charles A. Muserlian

(57) ABSTRACT

Ball screw, between the spindle nut (1) and threaded spindle (2) of which at least one ball chain (6, 8) formed from balls (9) rolls in each case along a ball channel (5) which is delimited by ball grooves (3, 4) formed on the spindle nut (1) and on the threaded spindle (2), the ball chain (6, 8) being deflected from one end of the ball channel (5) to a start of this ball channel (5) in deflection portions of the ball channel (5), one or more spring elements (11, 17, 27, 35) arranged in the ball chain (6, 8) between balls (9) of the ball chain (6, 8) exerting a pressure force on the balls (9) in the axis of the ball chain (6, 8).

8 Claims, 4 Drawing Sheets 13  11, 12  14

BALL SCREW

This application is a continuation of PCT/EP2003/012970 filed Nov. 20, 2003.

BACKGROUND OF THE INVENTION

The present invention relates to a ball screw. Ball screws of this type have a spindle nut which is arranged rotatably on a threaded spindle, with balls being interposed.

Ball screws can be subdivided into those with inner deflection and those with outer deflection.

Where inner deflection is concerned, a plurality of ball chains are often provided which extend in each case over about 360 degrees. The ball track extends over about 360 degrees, that is to say winds approximately once about the axis of rotation. The spindle nut has arranged in it deflection inserts which deflect the ball chain from the end of the ball track towards its start and at the same time lift the balls over the thread flank of the threaded spindle.

Where outer deflection is concerned, the ball chain, that is to say the ball track, often extends over a plurality of turns; the deflection piece is often arranged outside the spindle nut and, according to the length of the ball chain, spans a number of turns, that is to say thread flanks.

A ball chain comprises a multiplicity of balls arranged in a row. Intermediate pieces may be arranged between balls adjacent to one another. Intermediate pieces and balls are arranged loosely one behind the other. The ball chain is arranged in a ball channel which is delimited by ball grooves formed on the spindle nut and on the threaded spindle. Arranging the ball chain in the ball channel ensures that the balls are arranged as a ball chain. Intermediate pieces of this type may also be designated as spacers or distance pieces.

DE 101 22 106 A1, for example, has disclosed a ball screw between the spindle nut (1) and threaded spindle (2) of which at least one ball chain (6,8) formed from balls (9) rolls in each case along a ball channel (5) which is delimited by ball grooves (3,4) formed on the spindle nut (1) and on the treaded spindle (2), the ball chain (6,8) being deflected from one end of the ball channel (5) to a start of this ball channel (5) in deflection portions of the ball channel (5). Intermediate pieces are arranged between balls adjacent to one another. Intermediate pieces of this type rule out contact between balls adjacent to one another and therefore reduce wear as a result of friction. Furthermore, the balls can be guided more effectively in order to maintain a satisfactory; ball chain.

Ball screws are used increasingly in power-assisted steering gears of motor vehicles. Noises caused by the cycle of movement of the balls in the ball channel may be troublesome. The reason for undesirable noises of this kind may be an excessive final pitch-circle play of the ball chain. This means that balls arranged adjacently to one another may have play with respect to one another in the direction of extent of the balls and, for example, may butt against one another. In the case of ball chains without intermediate pieces, this noise source may be especially troublesome.

OBJECTS OF THE INVENTION

Ball screw between the spindle nut (1) and threaded spindle (2) of which at least one ball chain (6,8) formed from balls (9) rolls in each case along a ball channel (5) which is delimited by ball grooves (3,4) formed on the spindle nut (1) and on the treaded spindle (2), the ball chain (6,8) being deflected from one end of the ball channel (5) to a start of this ball channel (5) in deflection portions of the ball channel (5), in which an

THE INVENTION

This object is achieved, according to the invention, in that one or more spring elements arranged in the ball chain between balls of this ball chain exert a pressure force on the balls in the axis of the ball chain. This ensures that a play of the balls in the axis of the ball chain is reduced at least to an extent such that undesirable rattling noises or jolting of the ball chain are avoided. In addition to the spring elements, intermediate pieces may be arranged between successive balls, the said intermediate pieces merely holding the balls at a distance from one another. The intermediate pieces may be connected to one another by means of webs, so that a band of intermediate pieces is formed.

The intermediate pieces themselves may be developed in such a way that they themselves have sufficient resilient properties to exert the desired pressure force in the ball chain. In this case, there is no need for any separate spring elements.

In a development according to the invention, the number of spring elements arranged in the ball chain is dimensioned such that, during an orbit of the ball chain in the ball channel, there is always one of the spring elements in the load-free region of the ball channel. In the deflection portions of the ball channel, the balls are in the load-free region. Within this load-free region, a free play of the balls in the axis of the ball chain is ruled out on account of the arrangement of the spring elements.

In the case of ball screws with outer deflection, the load-free region in the deflection piece extends over a wide range; there are at any moment always a plurality of balls in the load-free region; it may be sufficient if one of the spring elements is arranged between only two of this plurality of balls. The play of the ball chain in the deflection portion can be absorbed by this one spring element. It is also conceivable that a single spring element in the ball chain is sufficient.

In the case of ball screws with inner deflection, the path of the load-free zone in the deflection region is markedly shorter than in ball screws with outer deflection. It may therefore be expedient to increase the ratio of the number of spring elements to the number of balls of the ball chain, as compared with ball screws with outer deflection; specifically, for example, to an extent such that there is likewise at any moment always one spring element in the load-free region.

The spring elements compensate all tolerance-, wear- or expansion-induced changes in chain length in a permanent elastic manner and thus keep the final pitch-circle play permanently at zero. As a result, both disturbing noises due to the butting of the ball in the circumferential direction and possible fault positions of the intermediate pieces which could lead to a jamming of the ball chain are avoided. In principle, one spring, element per spring chain is sufficient. In any event, the ball screw according to the invention ensures that the final pitch-circle play in the ball chain is cancelled, that is to say amounts to zero.

In a development according to the invention, the spring element comprises an intermediate piece which is formed from two intermediate-piece halves, each of the intermediate-piece halves being provided with a bearing surface for a ball, and a compression spring arranged between the two intermediate-piece halves springing the two intermediate-piece halves in the direction of the adjacent balls. The advantages may be seen in that on the one hand the intermediate-piece halves may be of rigid design, for example with spherical caps in which the balls are satisfactorily arranged. At the same time, the compression spring ensures that the balls are arranged, free of play, in the ball chain.

The intermediate piece may be formed from plastic or else as sheet metal. In both instances, intermediate pieces can be manufactured cost-effectively.

Whereas, in the above-described exemplary embodiment according to the invention, a commonly available compression spring, for example a helical compression spring, may be used, in another ball screw according to the invention there is provision for the spring element to be formed by an intermediate piece which is arranged between two balls adjacent to one another and holds the balls at a distance from one another and the arms of which partially surround the ball, the arms being designed resiliently. Intermediate pieces of this type may advantageously be formed, for example, from plastic by the injection-moulding method. The arms bear under resilient prestress against the ball and bend open elastically when the balls are pressed in the direction of the arms. In this case, too, a free play of the balls along the ball-chain axis and therefore rattling noises are ruled out, and a final pitch-circle play which could lead to rattling noises is avoided.

When the spring element is formed by a helical compression spring, this may advantageously be configured in such a way that the last turn arranged at both ends of the helical compression spring has a diameter which is smaller than the ball diameter, these last two turns being designed in each case as a seat for the balls. A helical compression spring known per se can therefore be given a second use, to be precise as a seat for the ball, in order to hold the latter satisfactorily in the ball chain.

If, for example, the intermediate piece is provided in each case with three arms for each ball which are arranged so as to be distributed on the circumference, this, on the one hand, ensures good self-centring and, on the other hand, provides a large space between these arms as a lubricant reservoir.

If the helical compression spring has a concave longitudinal profile, as seen in longitudinal section, that is to say has the contour of a hyperboloid of revolution, good self-centring, at the same time with a snug fit of this helical compression spring in the case of narrow deflection radii, is ensured.

For ball screws according to the invention, in which intermediate pieces are also provided in addition to the spring elements, the following rule as regards the number of balls, of spring elements and of intermediate pieces can be postulated:

The ball chain comprises Z balls and Y spring elements, Z minus Y intermediate pieces being provided. The quantities Z and Y are in this case natural numbers.

BRIEF DESCRIPTION OF THE DRAWINGS

The invention is explained in more detail below with reference to 7 exemplary embodiments illustrated in 10 figures overall. In the figures:

FIG. 10 will briefly be referred to first, in which a ball screw known per se is depicted in a perspective illustration. A spindle nut 1 is arranged rotatably on a threaded spindle 2. The spindle nut 1 is provided with a helically arranged ball groove 3. The threaded spindle 2 is provided with a helically arranged ball groove 4. The ball grooves 3, 4 are of thread-like design and delimit ball channels 5 in which ball chains 6 are arranged. Each ball chain 6 is deflected from one end of a common ball channel, that is to say a common turn, to a start of this ball channel 5, or of the turn, in a deflection portion of the ball channel 5, the said deflection portion being formed by a deflection piece 7. The ball chain 6 therefore winds endlessly along the ball channel 5 configured as a screw thread.

Particular embodiments of the ball chain which is the subject of the present invention are referred to below.

Figure 1:
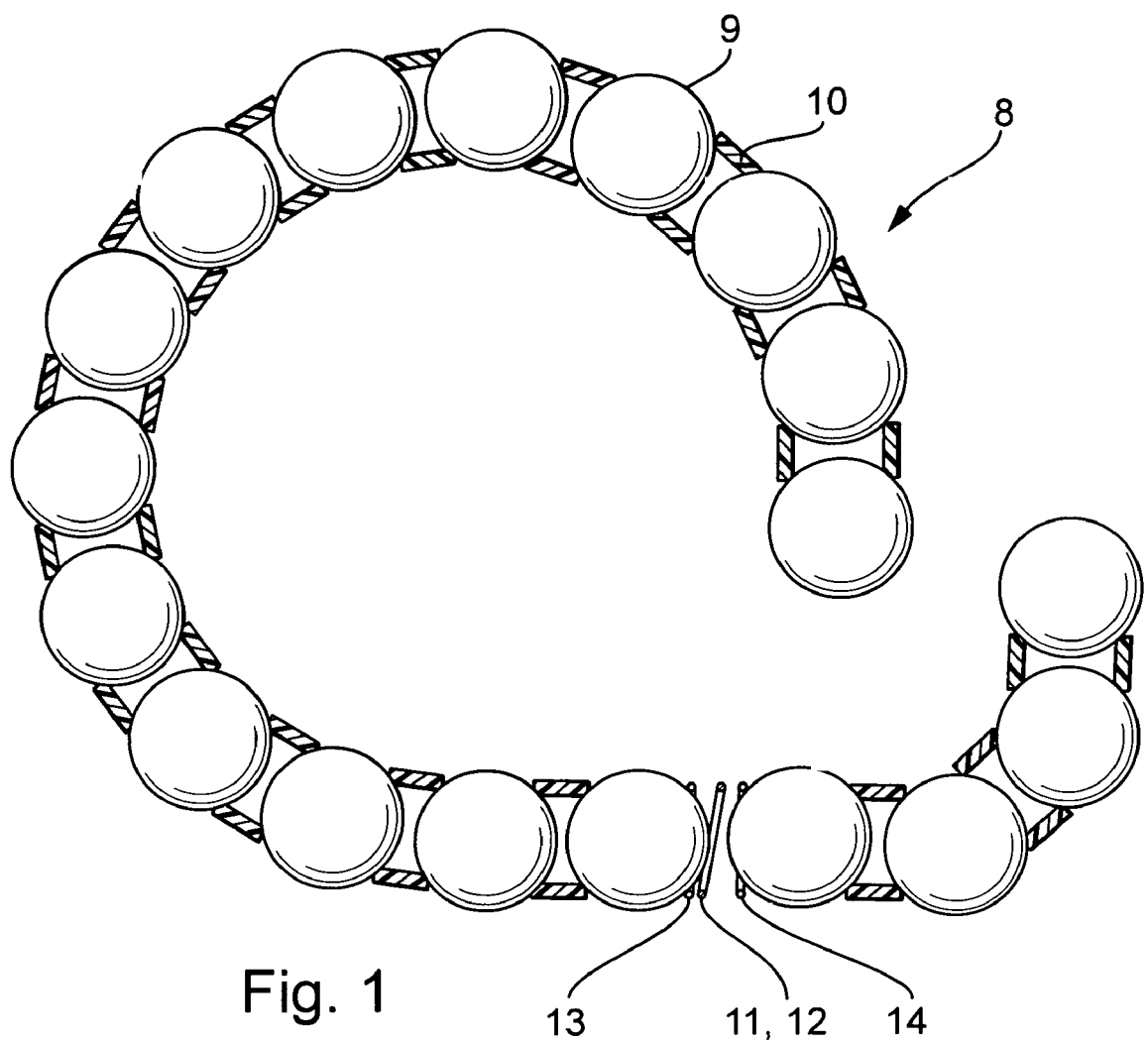
FIG. 1 shows a ball chain of a ball screw according to the invention.
Figure 2:
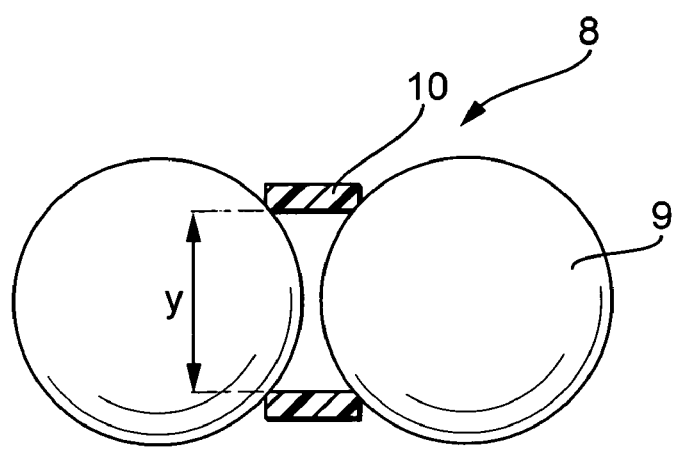
FIG. 2 shows a detail of the ball chain according to FIG. 1.

FIG. 1 shows a ball chain 8 of a ball screw according to the invention. Balls 9 are arranged in a row one behind the other. An intermediate piece 10 is arranged in each case between balls 9 arranged adjacently to one another. FIG. 2 shows clearly, in an enlarged illustration, the intermediate piece 10 which is designed as a ring. The inside diameter of the ring is smaller than the ball diameter, so that the balls 9 penetrate somewhat into the open end faces of the ring and are satisfactorily centred on the latter.

A spring element 11 is arranged at one point of the ball chain 8 between two balls 9 arranged adjacently to one another. This spring element is designed in the present case as a helical compression spring 12. The spring element 11 exerts a pressure force on the two adjacently arranged balls, so that all the balls 9 of the ball chain 8 are free of play. The final pitch-circle play, that is to say a free play between the first and last ball 9 of the ball chain 8, is ruled out. Rattling noises are consequently ruled out.

The first and last turn 13, 14 of the helical compression spring 12 has a turn diameter which is smaller than the ball diameter. The balls 9 penetrate with part of their circumference into these two turns 13, 14. These turns 13, 14 consequently form a ball seat 15, 16.

Figure 3:
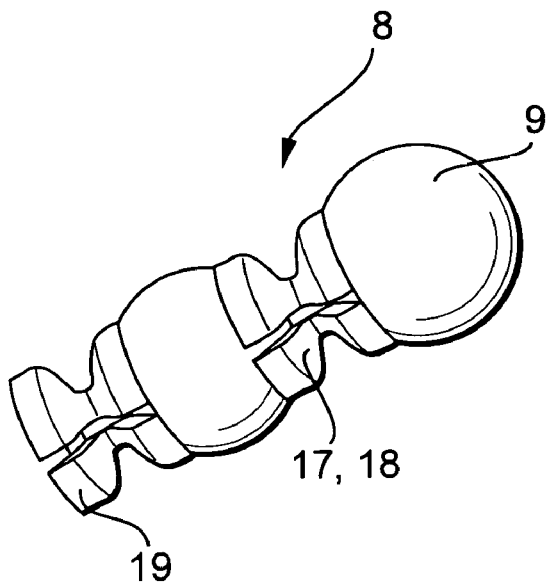
FIG. 3 shows a detail, as in FIG. 2, but with modified spring elements.

FIG. 3 shows a detail of the ball chain 8, but with modified spring elements 17. This spring element 17 is designed as an intermediate piece 18 holding balls 9 adjacent to one another at a distance from one another. The particular feature of this intermediate piece 18 is that a plurality of segments 19 are provided which are arranged so as to be distributed on the circumference and which partly surround the balls 9. These segments 19 are designed resiliently and are sprung under resilient prestress against the balls 9. This, too, ensures that an undesirable free play of the ball 9 in the ball chain 8 is ruled out.

Figure 4:
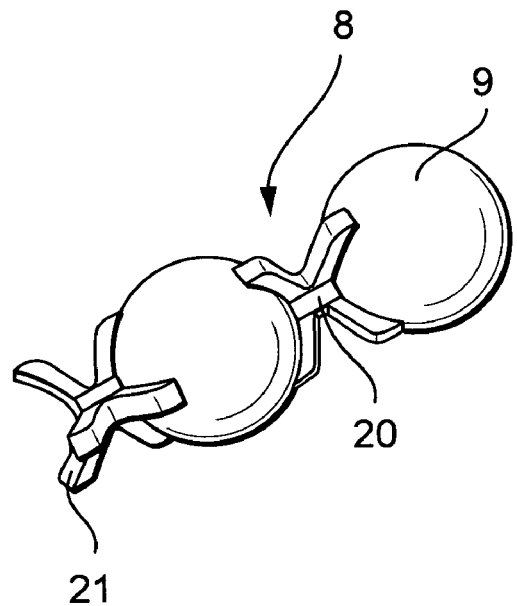
FIG. 4 shows a detail, as in FIG. 3, but with modified spring elements.
Figure 5:
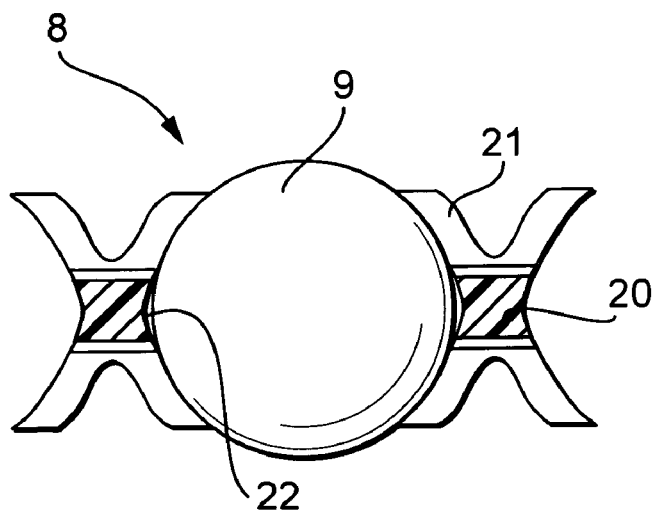
FIG. 5 shows a longitudinal section through the ball chain from FIG. 4.

FIG. 4 shows an intermediate piece 20 which is modified, as compared with FIG. 3, and in which resilient arms 21 are provided instead of segments. FIG. 5 shows clearly that these resilient arms 21 are sprung with their free ends against the balls 9. A free space 22 between the ball 9 and intermediate piece 20 can be seen in the region of the root of the arms 21. When the intermediate pieces 20 depicted in FIG. 5 are pressed towards one another, the arms 21 widen resiliently elastically, the free space 22 becoming smaller. This, too, ensures that a free play of the balls 9 in the ball chain 8 is ruled out.

Figure 6:
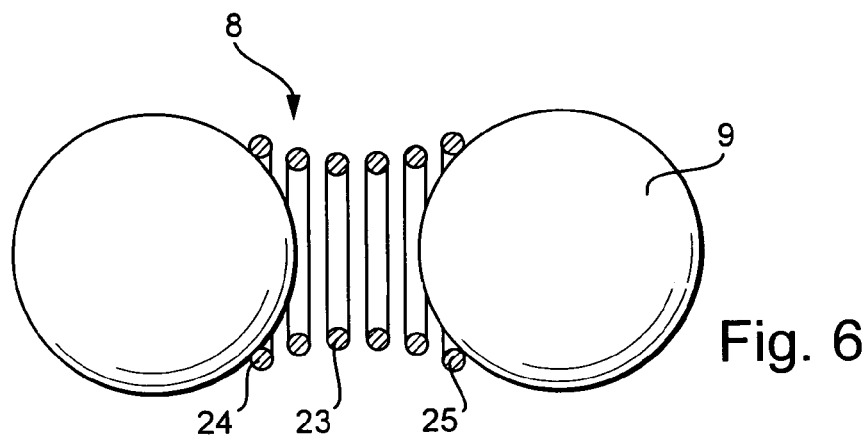
FIG. 6 shows a detail of a ball chain of a further ball screw according to the invention.

FIGS. 6 and 7 again depict part of the ball chain 8, a helical compression spring 23 being provided between two balls 9 arranged adjacently to one another. As in the exemplary embodiment in FIG. 1, there is provision, here too, for the first and last turn 24, 25 of the helical compression spring 23 to have a turn diameter which is smaller than the ball diameter. It can be seen clearly that the ball 9 penetrates with a small part of its circumference into these turns 24, 25. This ensures that the balls 9 are centred satisfactorily in the ball chain 8. It can be seen, furthermore, that the helical compression spring 23 has the configuration of a hyperboloid of revolution, as seen in longitudinal section. The configuration, narrowed in the middle region, of the helical compression spring 23 ensures that even narrow deflection radii in the ball channel 5 are mastered.

Figure 7:
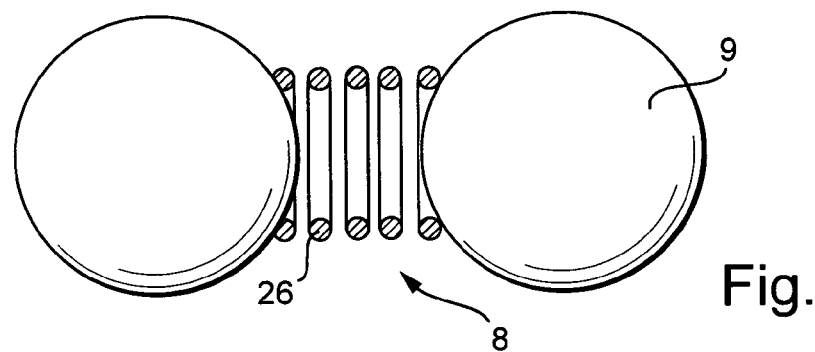
FIG. 7 shows an illustration, as in FIG. 6, but with a modified spring element.

The helical compression spring 26 proposed in FIG. 7 is designed cylindrically, as seen in longitudinal section.

Figure 8:
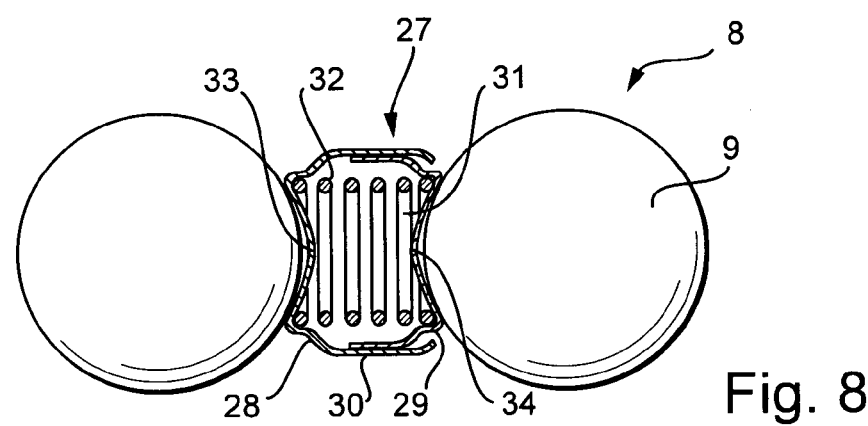
FIG. 8 shows an illustration, as in FIG. 6, but with a modified spring element.

FIG. 8 proposes a spring element 27 which comprises an intermediate piece 30 formed from two intermediate-piece halves 28, 29, the intermediate-piece halves 28, 29 being arranged displaceably with respect to one another along the axis of the ball chain 8. These intermediate-piece halves 28, 29 are bent from sheet metal and jointly delimit an inner space 31 in which a helical compression spring 32 is arranged. As in the exemplary embodiments referred to above, this helical compression spring 32 is prestressed resiliently and springs the two intermediate-piece halves 28, 29 against the two adjacently arranged balls 9. The two intermediate-piece halves 28, 29, on their sides facing the two balls 9, have ball seats 33, 34 designed in the form of a spherical cap.

Figure 9:
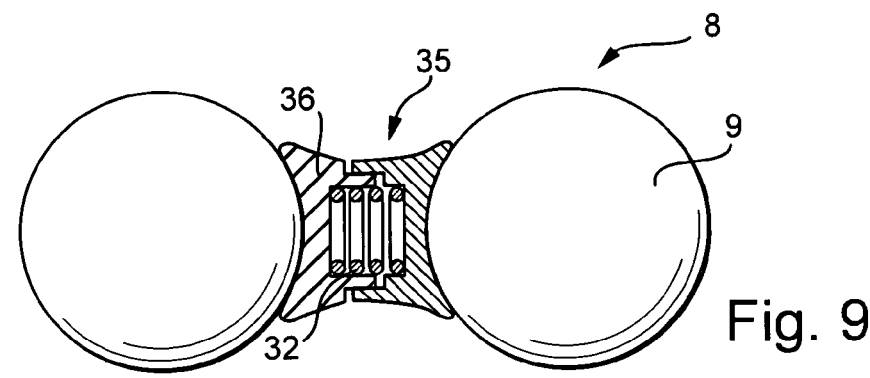
FIG. 9 shows an illustration, as in FIG. 6, but with a modified spring element.
Figure 10:
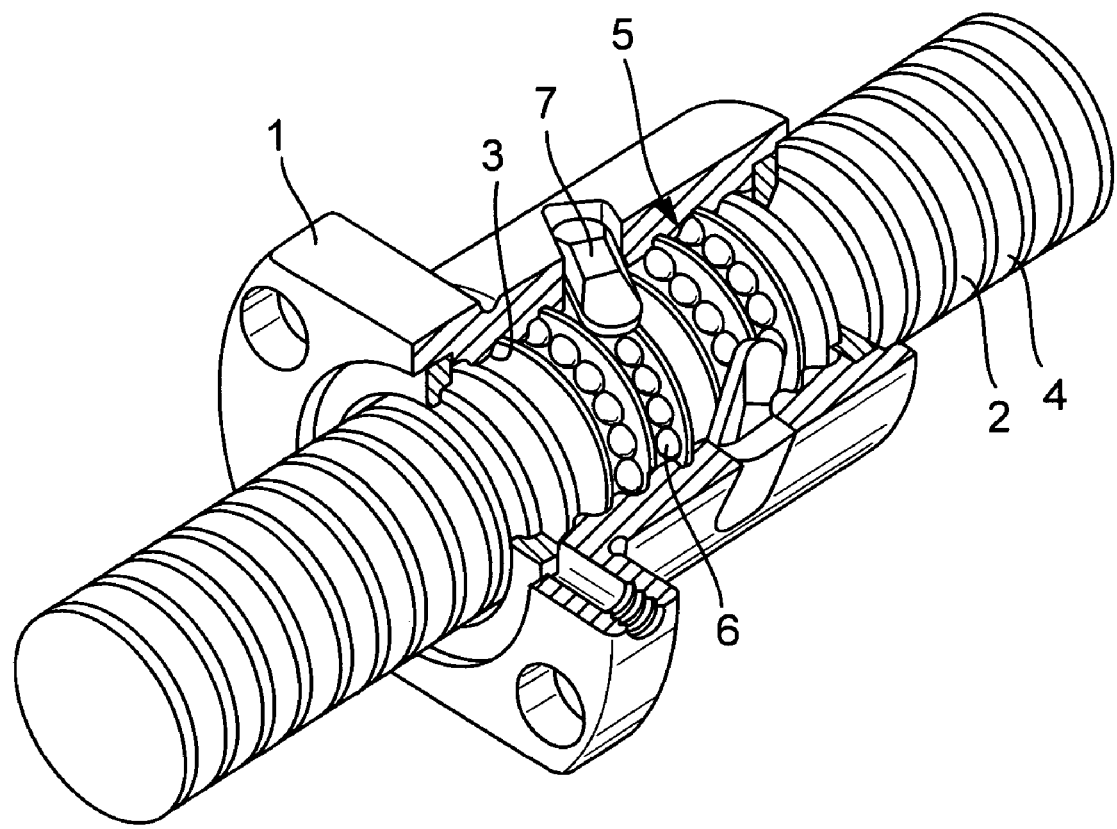
FIG. 10 shows the basic construction of a ball screw known per se.

FIG. 9 shows a modified spring element 35 which differs from that of FIG. 8 essentially in that the intermediate piece 36 is formed from plastic.

List of reference numerals

1 Spindle nut
2 Threaded spindle
3 Ball groove
4 Ball groove
5 Ball channel
6 Ball chain
7 Deflection piece
8 Ball chain
9 Ball
10 Intermediate piece
11 Spring element
12 Helical compression spring
13 Turn
14 Turn
15 Ball seat
16 Ball seat
17 Spring element
18 Intermediate piece
19 Segment
20 Intermediate piece
21 Arm
22 Free space
23 Helical compression spring

-continued
List of reference numerals

24 Turn
25 Turn
26 Helical compression spring
27 Spring element
28 Intermediate-piece half
29 Intermediate-piece half
30 Intermediate piece
31 Inner space
32 Helical compression spring
33 Ball seat
34 Ball seat
35 Spring element

The invention claimed is:

1. A ball screw, between the spindle nut (1) and threaded spindle (2) of which at least one ball chain (6, 8) formed from balls (9) rolls in each case along a ball channel (5) which is delimited by ball grooves (3, 4) formed on the spindle nut (1) and on the threaded spindle (2), the ball chain (6, 8) being deflected from one end of the ball channel (5) to a start of this ball channel (5) in deflection portions of the ball channel (5), wherein one or more spring elements (11, 17, 27, 35) arranged in the ball chain (8) between balls (9) of the ball chain (6, 8) exert a pressure force on the balls (9) in the axis of the ball chain (8) wherein the number spring elements (11, 17, 27, 35) arranged in the ball chain (6, 8) is dimensioned such that, during an orbit of the ball chain (6, 8), there is always one of the spring elements (11, 17, 27, 35) in the deflection portion of the ball channel (5).

2. A ball screw of claim 1, in which the spring element (27, 35) has an intermediate-piece (30), formed from two intermediate-piece halves (28, 29), each with a bearing surface for a ball (9), and a helical compression spring (32) which I arranged between the two intermediate-piece halves (28, 29) and springs on the two intermediate-piece halves (28, 29).

3. A ball screw of claim 2, in which the intermediate-piece halves (28, 29) are formed from plastic or from sheet metal.

4. A ball screw of claim 1, in which the spring element (27, 35) has an intermediate-piece (18, 20) which is arranged between two balls (9) adjacent to one another and holds the balls (9) at a distance from one another and the arms (21) or segments (19) of which partially surround the balls (9), the arms (21) or the segments (19) being designed resiliently.

5. A ball screw of claim 1, in which the spring element is formed by a compression spring, in particular a helical compression spring (12, 23, 26, 32).

6. A ball screw of claim 5, in which the last turns (13, 14, 24, 25) lying at both ends of the helical compression spring (12, 23, 26) have a diameter which is smaller than the ball diameter, the last turns (13, 14, 24, 25) being designed as a ball seat (15, 16, 33, 34).

7. A ball screw of claim 6, in which the helical compression spring (23) has a concave longitudinal profile, as seen in longitudinal section.

8. A ball screw of claim 1, in which the ball chain (6, 8) has z balls and y springs (23, 26, 12), z minus y intermediate-pieces (10) being provided.

* * * * *